Patented Nov. 16, 1948

2,453,764

UNITED STATES PATENT OFFICE 2,453,764

PROTECTION OF CERTAIN NONFERROUS METAL SURFACES

Eugene Snyder, Philadelphia, Pa., assignor to American Chemical Paint Company, Ambler, Pa., a corporation of Delaware No Drawing. Application August 28, 1944, Serial No. 551,633

12 Claims. (Cl. 148—6.20)

This invention relates to the treatment of metallic surfaces to inhibit or retard corrosion, and it has as a primary object the provision of certain improvements in the formulation and use of solutions adapted for this purpose. The solutions which the invention contemplates comprise an alkali chromate and an alkali cyanide in an aqueous medium. The treatment is primarily intended to protect surfaces consisting entirely or chiefly of zinc, copper or cadmium. It is applicable not only to objects which are of the same composition throughout, but also and especially to objects made of steel and having a relatively thin coating of one of the named metals or of an alloy thereof. In this latter case, the advantages of the invention are attained whether the metal coating has been applied by electrodeposition, by immersion plating, by contact plating, or by other means.

A primary effect of the treatment is substantially to delay the appearance of rust or tarnish, not only under conditions of ordinary atmospheric exposure, but even under highly corrosive conditions, as where the surface is subjected to salt spray or extremely high humidity at elevated temperatures.

The process involves the treatment of the surface to be protected with an aqueous solution comprising an alkali chromate and an alkali cyanide. The composition of this treating solution may vary over quite a substantial range. Using sodium compounds to illustrate the behavior of the class, it may be said that almost any amount of sodium chromate from 5 grams per 100 ml. up to the saturation point may be used. The amount of sodium cyanide employed, however, should not exceed 10 grams per 100 ml. although as little as ½ gram seems to be effective if sufficient time is allowed for the treatment. In practice, I prefer to use sodium chromate in concentrations between 10 and 30 grams per 100 ml. while employing sodium cyanide in proportions of from 2 to 4 grams per 100 ml.

In other words, the amount of alkali chromate may be anywhere from one to sixty times as great as the amount of alkali cyanide in the treating solution, but is preferably held within closer limits, using say from ten to thirty times as much of the alkali chromate as of the alkali cyanide.

An essential characteristic of the solution is the presence of the chromate ion and of the cyanide ion. The chromate ion may be supplied by the use of any of the alkali chromates.

On the other hand, the nature of the alkali component does not seem to be as important. Sodium chromate and sodium cyanide are referred to herein, in illustrating the invention, but equally satisfactory results may be obtained by using an equivalent alkali chromate or an equivalent alkali cyanide. For instance, potassium or lithium may be employed in lieu of sodium. It is not necessary that the alkali component of the chromate salt should be the same as the alkali component of the cyanide salt. For instance, the solution may contain sodium chromate and potassium cyanide, or vice versa. In fact, so long as the chromate and cyanide ions are present, it does not seem to matter whether the alkali ions are the same or diverse.

Aqueous treating solutions may readily be prepared at the point of use by simply adding the alkali chromate and the alkali cyanide in proportions within the ranges stated, and stirring until dissolved. Alternatively, a dry concentrate may be prepared in which the desired ratio of alkali chromate to alkali cyanide is predetermined, thus reducing the possibility of error in making up the solution. This dry concentrate is easily packed and can be economically transported. It does not deteriorate in storage to any considerable extent. It is an advantage of this invention that the treating solution may be prepared from ingredients which can safely be packed and handled in this way. Liquid solutions may also be prepared in advance, in working strength or in somewhat concentrated form, but these should be packed in containers which the alkali cyanide in the solution will not attack. Obviously, if the formula chosen calls for alkali chromate in a proportion near the saturation point, the premixed solution cannot well be further concentrated. The ratio of alkali chromate to alkali cyanide in the dry material will, of course, correspond to the ratios indicated as respects the working solution—that is, from one to sixty parts of the chromate compound to one of the cyanide compound, and, preferably from ten to thirty of the former to one of the latter.

The process is quite simple. The work is first treated in the main solution, preferably by dipping. Alternatively, the solution may be applied in any convenient way, as by washing or by spraying. This treatment is followed by a rinse in clean water. The work is then allowed to dry, and it is very desirable to assist the drying by employing temperatures in the neighborhood of 150° F. and over for this purpose.

The film remaining after the treatment thus far described is especially effective where an organic protective coating such as paint, varnish, lacquer or the like is subsequently applied. It is also capable of serving as a final coating even without the application of paint, but, where used in this way, better results are obtained if the work is rinsed after the primary treatment with a dilute solution of a normal alkali chromate. Preferably this rinsing solution contains the same alkali chromate as the treating solution, but a different alkali chromate may be employed if desired. This dilute rinsing solution should be used hot, say at temperatures between about 160° F. and the boiling point. A good working range is from 180° F. to 200° F. It should contain from 0.1 to 1.0 grams per 100 ml. of sodium chromate ($Na_2CRO_4$), or an equivalent amount of other alkali chromate. The film of rinsing solution which adheres to the surface is then allowed to dry in situ. The drying may take place at room temperature or at elevated temperatures, and any heat absorbed by the metal from the hot rinsing solution will also facilitate the evaporation of moisture.

Although the proportions stated herein are all in terms of sodium chromate and sodium cyanide, it will be quite obvious that strictly comparable results may be secured when using other salts of the class mentioned by adjusting the amounts stoichiometrically.

Considering some aspects of the process in greater detail, it may be noted that the primary treating solution discussed above may be used at room temperature if desired. Good results are obtained in a shorter time, however, if the solution is used hot. On the other hand, it should be remembered that cyanide is lost by hydrolysis at an increasing rate as the temperature rises, and that cyanide lost from the solution in this way must be restored if the treatment is to be carried out at optimum efficiency. This is quite important where a succession of pieces is to be treated.

With these observations in mind, it has been found that a temperature range from about 140° F. to 190° F. produces desirable results quite readily. Within this range, maximum efficiency seems to be reached at a temperature of approximately 180° F.

The time of the treatment will vary with the temperature employed and the concentration of the solution, and, in addition, will be influenced to some extent by the nature of the metal being treated. In general, since the treatment removes a small amount of the metal, it is necessary to shorten the treating time or reduce the proportion of the cyanide component where the metal or alloy surface constitutes an extremely thin layer. Under most conditions, however, and for a given concentration of alkali cyanide, the time required for treatment will vary from one hour at room temperature, to just a few minuites at 180° F. Excellent results have been obtained at the latter temperature in three minutes or even less, although, especially with more dilute solutions, it may be wise to continue the treatment for as long as fifteen minutes even at the higher temperature. It may be said that prolonging the treatment has no harmful effects except that the amount of metal removed will be slightly greater. Even this is not in direct proportion. The coating itself seems to retard the rate at which the metal is attacked.

As respects the strength of the primary treating solution, it is noted that useful results have been secured throughout the range of composition first mentioned. However, much better results are attained within the somewhat narrower range suggested. Insofar as the amount of alkali chromate used is concerned, any concentration above 5 grams per 100 ml. of solution and below the saturation point seems to be effective. Below 5 grams there is difficulty in securing satisfactory results. Where more than 30 grams per 100 ml. is employed, the dragout losses increase rapidly and out of all proportion to the improvement in result. As to the alkali cyanide, there seems to be very little useful result if less than ½ gram per 100 ml. is employed. Best results, as noted, are obtained with from 2 to 4 grams per 100 ml. Above this point the attack on the metal treated becomes appreciable, and it then becomes necessary to consider this effect in relation to the thickness of the metal coating. Where the metal coating is quite thick, or where the article is of massive metal—that is of the same metal throughout—concentrations as high as 10 grams per 100 ml. of sodium cyanide are entirely practical.

It has been mentioned that a final treatment with a very dilute solution of a normal alkali chromate is desirable where the film produced by the primary treatment is to serve as the ultimate surface coat. This chromate rinse may be applied directly after the primary treatment, if desired, without first using a water rinse or allowing an interval for drying. It is generally better, however, to wash the surface with water before using the dilute chromate rinse referred to. It should be mentioned, perhaps, that, although the final rinsing with normal chromate is very desirable if no organic coating is to be subsequently applied, it is better to omit this step where paints or varnishes are to be subsequently used, and instead to wash the work with clean water which does not contain normal chromate. This is particularly important where the painted surface will have to withstand conditions of high humidity.

One aspect of the invention which is of considerable practical importance is the fact that the films produced may safely be dried at elevated temperatures without fear of impairing their ultimate utility. This is possible whether or not a dilute normal chromate rinse is employed. A substantial gain in overall processing time results from this fact. In addition, since elevated temperatures are not harmful, it is possible to use hot rinsing, either with water or with the dilute chromate solution, or with both, thereby making the rinsing treatment more effective and at the same time increasing the temperature of the work, which still further reduces the time required for drying.

It may be noted that the treatment described produces a rose-red film on brass or copper surfaces and a film which is practically invisible on zinc or cadmium. The effect of the treatment is to render the surface treated almost immune to the attack of normal corrosive influences, and proof against corrosive conditions for a much longer time than untreated surfaces. Where the surface constitutes a lamina of copper, zinc or cadmium upon a basis metal, such as iron, steel, or aluminum, there seems to be an additional effect, in that deterioration at the interface seems to be indefinitely postponed.

I claim:

1. For metallic surfaces having as a major constituent a metal chosen from the group consisting of copper, zinc and cadmium, a process for increasing resistance to corrosive influences which comprises the steps of treating the metal surface with an aqueous solution the essential active ingredients of which, per 100 ml. of solution, consist of an alkali chromate equivalent to at least 5 grams of sodium chromate and an alkali cyanide equivalent to from ½ to 10 grams of sodium cyanide, and thereafter washing the surface with a water rinse.

2. The process of claim 1 in which the alkali chromate present is equivalent to from 10 to 30 grams of sodium chromate per 100 ml. and the alkali cyanide present is equivalent to from 2 to 4 grams of sodium cyanide.

3. The process of claim 1 in which the treatment is carried out at a temperature of from 140 to 190° F.

4. A process according to claim 1 and further including the step of drying the treated surface at a temperature of 150° F. or above.

5. The process of claim 1 in which to the aqueous rinse there is added a normal alkali chromate equivalent to from 0.1 to 1.0% of sodium chromate, and in which the adhering film of said rinsing solution is allowed to dry in situ.

6. A process according to claim 1 and further including the steps of rinsing the treated and washed surface with an aqueous solution in which has been dissolved a normal alkali chromate equivalent to from 0.1 to 1.0% of sodium chromate, and drying the rinsed surface by evaporation.

7. For metallic surfaces having as at least the major constituent a metal chosen from the group consisting of copper, zinc and cadmium, a process for increasing resistance to corrosive influences, which process includes the steps of treating the metal surface with an aqueous solution the essential active ingredients of which consist of chromate ions in an amount equal to that resulting from the presence of at least 5 grams of sodium chromate per 100 ml. of solution and cyanide ions in an amount equal to that resulting from the presence of from ½ to 10 grams of sodium cyanide per 100 ml. of solution; washing the surface with water; and applying a final protective coating to the surface so treated.

8. The process of claim 7 in which the final protective coating is an organic film.

9. The process of claim 7 in which the final protective coating is an inorganic deposit and is applied by rinsing the treated surface with a dilute aqueous solution of a normal alkali chromate, and drying the rinsed surface by evaporation.

10. The process of claim 7 in which the final protective coating is an inorganic deposit and is applied by rinsing the treated surface with a dilute aqueous solution of a normal alkali chromate at a temperature of at least 180° F., and allowing the adhering film of said solution to dry in situ.

11. A treating solution for application to a metallic surface having as a major constituent a metal of the group consisting of copper, zinc and cadmium, the essential active ingredients of said solution consisting of

|  | Grams |
|---|---|
| Alkali chromate | 5–30 |
| Alkali cyanide | .5–10 | in each 100 ml. of water.

12. A dry concentrate for use in preparing the solution of claim 11, and consisting of from 2.5 to 15 parts of normal alkali chromate to 1 part of alkali cyanide.

EUGENE SNYDER.

REFERENCES CITED

The following references are of record in the file of this patent:

UNITED STATES PATENTS

| Number | Name | Date |
|---|---|---|
| 19,804 | Vaughn | Mar. 30, 1858 |
| 1,791,715 | Darsey | Feb. 10, 1931 |
| 1,927,671 | Shiraiski | Sept. 19, 1933 |
| 2,016,477 | Bassett | Oct. 8, 1935 |
| 2,016,677 | Kramer | Oct. 8, 1935 |
| 2,067,216 | Thompson et al. | Jan. 12, 1937 |
| 2,148,331 | Weisberg et al. | Feb. 21, 1939 |
| 2,310,239 | Jernstedt | Feb. 9, 1943 |

FOREIGN PATENTS

| Number | Country | Date |
|---|---|---|
| 341,461 | Germany | Oct. 3, 1921 |